April 19, 1966 A. NOYES, JR 3,247,458

MONOSTABLE MULTIVIBRATOR EMPLOYING CAPACITIVE FEEDBACK CIRCUIT MAINTAINING VOLTAGE ACROSS INPUT CIRCUIT SUBSTANTIALLY CONSTANT

Original Filed July 1, 1948

TUBE 30 GRID

TUBE 30 PLATE

TUBE 36 A GRID

TUBE 36 A PLATE

INVENTOR
ATHERTON NOYES, JR.

BY Brown, Schuyler & Beveridge
ATTORNEYS

United States Patent Office 3,247,458
Patented Apr. 19, 1966

3,247,458
MONOSTABLE MULTIVIBRATOR EMPLOYING CAPACITIVE FEEDBACK CIRCUIT MAINTAINING VOLTAGE ACROSS INPUT CIRCUIT SUBSTANTIALLY CONSTANT

Atherton Noyes, Jr., Mountain Lakes, N.J., assignor to Aircraft Radio Corporation, Boonton, N.J., a corporation of New Jersey Original application July 1, 1948, Ser. No. 36,494, now Patent No. 3,087,152, dated Apr. 23, 1963. Divided and this application Sept. 18, 1962, Ser. No. 229,515
6 Claims. (Cl. 328—207)

This invention relates to a multivibrator or shaper circuit and more particularly a one-shot multivibrator circuit. This application is a division of my application Serial No. 36,494, filed July 1, 1948, now Patent 3,087,152, issued April 23, 1963.

An object of this invention is to provide an improved one-shot multivibrator circuit.

Another object of this invention is to provide a circuit for developing substantially uniform magnitude duration signal pulses from input pulses of varying intensity or amplitude.

The invention features a pair of amplifying elements with circuit elements connecting said amplifying elements for one-shot multivibrator operation and in which the means for determining the duration of the stroke of the multivibrator is not directly in the cross-connection circuitry between the control and output electrodes of the respective amplifying elements. The invention also features a feedback connection for obviating the effect of varying signal input strength on the stroke of the multivibrator.

Figure 1:
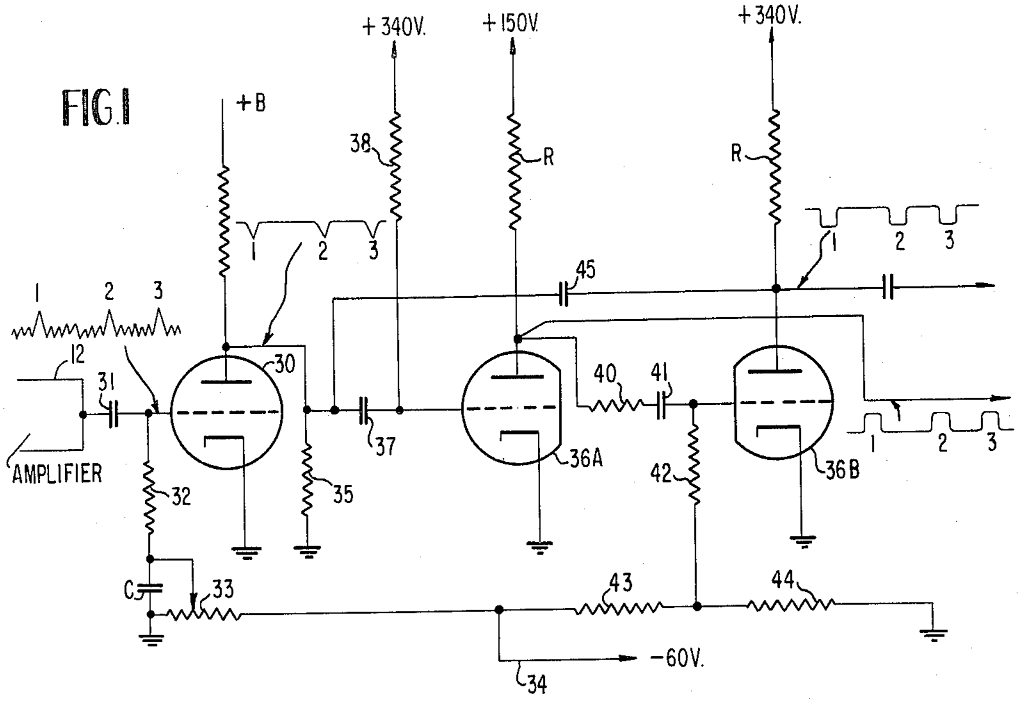

Other objects, advantages and features of the invention will become apparent from the following specification taken in conjunction with the accompanying drawings wherein:

FIG. 1 is an illustrative embodiment of a multivibrator circuit incorporating the invention; and FIGS. 2A through 2D, inclusive, are typical curves showing wave forms developed by weak and strong signal pulses, respectively, in the operation of the circuit.

With reference to FIG. 1, the input circuit comprises a triode 30 having a grounded cathode and a grid upon which a wave form comprising noise and signal peaks 1, 2 and 3 is impressed from the amplifier 12 through a coupling condenser 31. The grid is adjustably biased negatively through a fixed resistor 32 and potentiometer 33 connected to a bus or line 34 maintained at a negative potential which, as indicated by the legend, may be −60 volts. The bias is so adjusted below cut-off that the tube 30 suppresses noise and clutter components, and the tube 30 output consists of three negative voltage peaks 1, 2 and 3 which are developed across output resistor 35.

The shaper is a novel one-shot multivibrator comprising triodes 36A, 36B which may be, as shown schematically, enclosed in a single envelope, and which has approximately a 2 microsecond duration and with constants such that it is able to repeat rapidly. The input to triode 36A is through a condenser 37 connected between its grid and the plate of tube 30, and triode 36A is normally conductive in view of a positive voltage imposed on the grid through resistor 38, of the order of 400,000 ohms, which is connected to a point of high positive voltage, for example to the +340 volt source. The plate of triode 36A is connected to the grid of triode 36B through a resistor 40 and relatively large isolating condenser 41, and the grid of triode 36B is normally biased negatively to cut-off by resistor 42 which connects the grid to the junction of voltage-divider resistors 43, 44 in series between the negative potential bus 34 and ground.

As distinguished from conventional multivibrators, the circuit elements which determine the duration of the stroke are not directly in the feedback paths from plates to opposite grids. In this circuit the duration-determining constants are the input coupling condenser 37 and the resistor 38; in conventional multivibrators of this type, the duration-determining constants would be connected directly from one plate to the opposite grid, and the input trigger signal connected to grid, or plate, in parallel thereto.

Whereas, in conventional multivibrators, the feedback arising from the operation of the circuit is applied directly to a grid, which, in turn may in some instances be also the grid to which the input trigger is applied by way of some coupling impedance, in this circuit the feedback is applied directly to the trigger source itself and is utilized to maintain the voltage output of the trigger source at a suitable value, regardless of what value it would have had in the absence of this feedback.

In this way the elements which determine the duration of the multivibrator stroke (namely the condenser 37 and the resistor 38) are enabled to operate under constant conditions, and thereby to maintain the multivibrator stroke itself constant.

It is apparent from the above, of course, that the multivibrator must be a "stiff" source for feedback relative to the plate circuit of tube 30 as a load; this condition is readily achieved, for the impedance of the plate circuit of tube 36B during the stroke is very low due to the positive voltage on its grid during this period.

The sequence of operations in the circuit is as follows: A negative voltage pulse imposed on the grid of tube 36A by way of condenser 37 from tube 30 causes a decrease in the plate current of tube 36A. The resulting rise in plate voltage is carried, by way of resistor 40 and large condenser 41, to the grid of tube 36B where it causes plate current to flow. The resulting drop in plate voltage of tube 36B is fed back to the plate circuit of tube 30 by way of large condenser 45, and thereby amplifies the original trigger by regeneration at this point. Tube 36A is thus carried far below cut-off, and tube 36B is caused to conduct very heavily. At this instant, and for the duration of the cycle, the high side of the input circuit, i.e. the plate of tube 30, is depressed in voltage by the same amount as the fall in voltage of the plate of tube 36B, for condenser 45 is so large (for instance, 1000 micromicrofarads) that the voltage across it does not change materially during the short duration of the multivibrator stroke.

One side of condenser 37 is thus held at a definite voltage, far negative with respect to its quiescent value; the other side is connected to a large positive voltage through resistor 38. Condenser 37 is relatively small (for instance 20 micromicrofarads) and therefore charges rapidly toward the supply voltage (340 volts, for instance, as shown on FIG. 1). As soon as the voltage on the grid side of condenser 37 rises about the cut-off voltage of tube 36A this tube begins to draw current again, feedbacks of the opposite sense arise, as is well known in the art, and the cycle ends abruptly. The feedback through the large condenser 45 thus acts to stabilize the length of the cycle, independent of the wave shape, amplitude and duration of the triggering pulses at the tube 30, by maintaining the voltage on the left end side of condenser 37 at a constant value. The input circuit condenser 37 is thereby permitted to charge under uniform conditions, regardless of the form of the trigger signal, until triode 36A is once more conductive and ends the cycle.

Figure 2A:
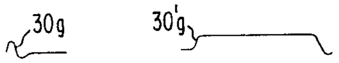
Figure 2B:
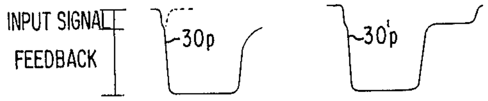
Figure 2C:
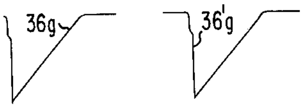
Figure 2D:
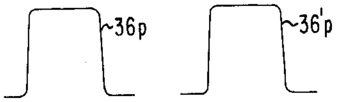

The typical qualitative voltage curves of Figs. 2A to 2D illustrate the manner in which the described shaper circuit operates to develop output pulses which are essentially independent of the amplitude and duration of the incoming triggers. In Fig. 2A, the curves 30*g* and 30'*g* show the form of positive voltage pulses imposed upon the grid of tube 30 by delatively weak and relatively strong signals, respectively; except for the feedback path above noted the plate voltage waves would differ from each other in similar fashion. However, in the actual circuit the resultant voltage waves 30*p* and 30'*p* at the plate of tube 30 are as shown in Fig. 2B. It is to be noted that the drop in plate voltage for an arriving weak signal includes an initial section, indicated by the legend "Input Signal," and a supplemental and further voltage drop due to feedback through condenser 45 and identified by legend "Feedback." The resultant variations in grid potential at tube 36A are shown in Fig. 2C by curves 36*g* and 36'*g* for weak and strong signals, respectively. The inputs to the grid of shaper tube 36A being thus substantially constant for both weak and strong signals, the significant output voltage pulses from the shaper are thus of a shape and timing substantially independent of the amplitude and duration of the arriving signal pulses.

It is to be noted that a very strong input trigger which has been lengthened by overloads to a duration longer than the desired shaper stroke (right hand side of Fig. 2A) produces a corresponding lengthened disturbance in the plate of tube 30 (right hand side of Fig. 2B) but that no corresponding lengthening is caused in the shaper grid circuit (right hand side of Fig. 2C) or in the shaper plate-voltage waves, 36*p* or 36'*p* (Fig. 2D) which have the same duration as this grid wave. Conversely, a weak and short input trigger which, in the absence of feedback, would tend with its trailing edge to give a positive impulse to the grid of tube 36A (as indicated by dotted line in Fig. 2B) and thus end the stroke prematurely, is prevented from so doing by feedback applied in accordance with this invention, (see the left hand side of Fig. 2B).

Positive square wave output pulses may be taken off of the plate of tube 36A, while negative square pulses corresponding to the incoming triggers may be taken off the plate of tube 36B as shown in the drawings.

It is to be understood that the disclosed circuit is but one illustrative embodiment of a multivibrator or shaper circuit incorporating the invention and is, therefore, not limited to the circuit and circuit elements herein shown and described since various changes may be made without departing from the scope of the invention as set forth in the following claims.

I claim:

1. A shaper circuit for developing square wave output signals of substantially constant amplitude and duration from triggering signals of widely varying amplitude and duration, said shaper circuit including a pair of tubes each having a control grid and plate cooperating with a cathode, means operatively connecting said pair of tubes in said shaper circuit, means connected to the grid of a first of said tubes normally biasing said first of said tubes to render that tube normally conductive, means connected to the grid of a second of said tubes; normally biasing the said second of said tubes to render that tube normally non-conductive, means connecting the plate of the normally conductive tube to the grid of the second tube to render the latter conductive upon non-conduction of said normally conductive tube, an input circuit, a low impedance capacitive feedback circuit from the plate of said second and normally non-conductive tube to said input circuit, input means for developing a trigger voltage across said input circuit, means comprising said feedback circuit for maintaining the voltage across said input circuit substantially constant during the time said second tube is conductive, and timing means connecting the grid of said first and normally conductive tube to said input circuit and to a source of positive voltage for establishing the duration of said conducting period of said second tube.

2. A shaper circuit as recited in claim 1, wherein said input means includes means responsive to arriving trigger signals of varying amplitude and duration to develop across said input circuit a trigger voltage component of similarly varying amplitude and duration.

3. A shaper circuit as recited in claim 1, wherein said timing means comprises a coupling condenser of low capacity connected between the grid of the normally conductive tube and said input circuit, and said capactive feedback circuit is connected from the plate of the normally non-conductive tube to the input side of said coupling condenser.

4. A shaper circuit as recited in claim 3, wherein said timing means includes a resistor of high value connected between the grid of said normally conductive tube and the source of positive voltage.

5. In a monostable multivibrator circuit having input and output terminals, said multivibrator having an unstable phase of operation initiated by a trigger signal applied to said input terminal, a timing circuit including a series connected capacitance and resistance and a high potential source connected to said resistance, means connecting the common point of said resistance and capacitance to said input terminal, a low impedance capacitance feedback circuit connected between said output terminal and the opposite side of said capacitance from the side connected to said resistance for maintining the potential at said opposite side substantially constant during the unstable phase of operation of said multivibrator, and means connected to said multivibrator circuit for applying trigger pulses to said multivibrator circuit through said capacitance to initiate said unstable phase of operation.

6. In a monostable multivibrator circuit, a timing circuit for said multivibrator including a capacitor, means connecting said capacitor between said multivibrator circuit and a source of trigger pulses so that said capacitor passes trigger pulses to said multivibrator circuit, and a capacitive feedback circuit connected between an output terminal of said multivibrator and the side of said capacitor connected to said source of trigger pulses for maintaining the potential at said side connected to said source of trigger pulses substantially constant during the unstable state of said multivibrator.

References Cited by the Examiner

UNITED STATES PATENTS 2,688,079 8/1954 Wachtell ---------- 328—207

ARTHUR GAUSS, *Primary Examiner.*